United States Patent
Hu et al.

(10) Patent No.: US 10,197,900 B2
(45) Date of Patent: Feb. 5, 2019

(54) LIGHT-EMITTING DEVICE EMPLOYING A REFLECTIVE LIGHT FOCUSING SYSTEM HAVING A FOCUSING REGION AND A NON-FOCUSING REGION AND PROJECTION SYSTEM INCORPORATING THE SAME

(71) Applicant: APPOTRONIC CHINA CORPORATION, Shenzhen (CN)

(72) Inventors: Fei Hu, Shenzhen (CN); Haixiong Hou, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 331 days.

(21) Appl. No.: 14/785,847

(22) PCT Filed: Apr. 11, 2014

(86) PCT No.: PCT/CN2014/075190
§ 371 (c)(1),
(2) Date: Oct. 20, 2015

(87) PCT Pub. No.: WO2014/169784
PCT Pub. Date: Oct. 23, 2014

(65) Prior Publication Data
US 2016/0091783 A1 Mar. 31, 2016

(30) Foreign Application Priority Data
Apr. 20, 2013 (CN) .......................... 2013 1 0138442

(51) Int. Cl.
*G03B 21/00* (2006.01)
*G03B 21/20* (2006.01)
(Continued)

(52) U.S. Cl.
CPC ............ *G03B 21/208* (2013.01); *F21V 13/04* (2013.01); *G02B 6/0006* (2013.01);
(Continued)

(58) Field of Classification Search
CPC .............. G03B 21/208; G03B 21/2013; G03B 21/2033; G03B 21/26; G03B 21/206;
(Continued)

(56) References Cited

U.S. PATENT DOCUMENTS 4,747,030 A * 5/1988 Offner ................. G03F 7/70058
362/17
6,425,677 B1 * 7/2002 Chuang ................. F21V 7/0025
348/E5.137
(Continued)

FOREIGN PATENT DOCUMENTS

| CN | 101405653 A | 4/2009 |
| CN | 101719738 A | 6/2010 |

(Continued)

OTHER PUBLICATIONS

Chinese Office Action, dated Jun. 9, 2015 and Search Report dated May 28, 2015 in a counterpart Chinese patent application, No. CN 201310138442.8.
(Continued)

*Primary Examiner* — Evan Dzierzynski
*Assistant Examiner* — Gerald J Sufleta, II
(74) *Attorney, Agent, or Firm* — Chen Yoshimura LLP

(57) ABSTRACT

A light-emitting device and a projection system, comprising: a laser array light source which comprises a non-light-emitting region and a light-emitting region consisting of a plurality of laser elements; a reflective light-condensing system which comprises a light-condensing region and a non-light-condensing region, wherein the light-condensing region is used for focusing and reflecting emergent light of
(Continued)

the laser array light source; and a light-collecting system used for collecting and emitting the emergent light from the reflective light-condensing system. The light-collecting system, the non-light-emitting region and the non-light-condensing region are located in the same straight line parallel to a light axis of the emergent light of the laser array light source, and the light-collecting system passes through the non-light-emitting region and/or the non-light-condensing region. The light-emitting device and the projection system have small volumes and can emit high-brightness and uniform faculae.

12 Claims, 6 Drawing Sheets

(51) Int. Cl.
    *G02B 27/10*     (2006.01)
    *F21V 8/00*     (2006.01)
    *F21V 13/04*     (2006.01)
    *G03B 21/14*     (2006.01)
    *F21V 13/00*     (2006.01)
    *G02B 27/30*     (2006.01)

(52) U.S. Cl.
    CPC ......... *G02B 27/1006* (2013.01); *G03B 21/14* (2013.01); *G03B 21/20* (2013.01); *G03B 21/2013* (2013.01); *G03B 21/2033* (2013.01); *G03B 21/2066* (2013.01); *F21V 13/00* (2013.01); *G02B 27/30* (2013.01)

(58) Field of Classification Search
    CPC ............ G03B 21/2046; G03B 21/2053; G02B 27/0977; G02B 27/0983; G02B 27/10; G02B 27/0994
    USPC .......... 362/235–236, 242–243, 245; 359/583
    See application file for complete search history.

(56) References Cited

U.S. PATENT DOCUMENTS

| | | |
|---|---|---|
| 6,902,310 B2 | 6/2005 | Lim |
| 7,988,305 B2 | 8/2011 | Itoh et al. |
| 2003/0147255 A1* | 8/2003 | Im .......................... G02B 27/18 362/558 |
| 2007/0236956 A1* | 10/2007 | Kolodin ............... G02B 6/0008 362/555 |
| 2007/0291491 A1* | 12/2007 | Li ........................ G02B 6/0008 362/307 |
| 2010/0231862 A1 | 9/2010 | Itoh et al. |

FOREIGN PATENT DOCUMENTS

| | | |
|---|---|---|
| CN | 102540679 A | 7/2012 |
| CN | 102566230 A | 7/2012 |
| CN | 102591120 A | 7/2012 |
| CN | 102722073 A | 10/2012 |
| CN | 102736386 A | 10/2012 |
| JP | H5-335663 A | 12/1993 |
| JP | 2012-27052 A | 2/2012 |
| JP | 2012-185872 A | 9/2012 |
| KR | 2003-0065846 | 8/2003 |
| TW | 590336 U | 6/2004 |
| TW | 200835997 A | 9/2008 |

OTHER PUBLICATIONS

Chinese Office Action, dated Dec. 9, 2015 in a counterpart Chinese patent application, No. CN 201310138442.8.
Chinese Office Action, dated May 17, 2016 in a counterpart Chinese patent application, No. CN 201310138442.8.
Japanese Office Action, dated Jul. 26, 2016 in a counterpart Japanese patent application, No. JP 2016-507990.
Japanese Office Action, dated Nov. 29, 2016 in a counterpart Japanese patent application, No. JP 2016-507990.
Korean Office Action, dated Oct. 25, 2016 in a counterpart application KR 10-2015-7032302.
Korean Office Action, dated Apr. 6, 2017 in a counterpart application KR 10-2015-7032302.
Supplementary European Search Report, dated Sep. 9, 2016 in corresponding application EP 14784912.9.
International Search Report in the parent PCT application No. PCT/CN2014/075190, dated Jul. 14, 2014.
IPRP in the parent PCT application No. PCT/CN20141075190, dated Oct. 20, 2015.

* cited by examiner

LIGHT-EMITTING DEVICE EMPLOYING A REFLECTIVE LIGHT FOCUSING SYSTEM HAVING A FOCUSING REGION AND A NON-FOCUSING REGION AND PROJECTION SYSTEM INCORPORATING THE SAME

BACKGROUND OF THE INVENTION

Field of the Invention

This invention relates to illumination and display fields, and in particular, it relates to a light emitting device and a projection system.

Description of Related Art

As television and other display apparatus are adopting high resolutions and large sizes, their requirements for brightness of the light source increase. In particular, for special applications such as cinema projection systems, light sources up to ten thousand lumens are often required.

To achieve high brightness light sources, conventional technologies use array light sources formed by arrayed light emitting elements, and compress the output light of the array light source to increase brightness. For example, FIG. 1 illustrates a light emitting device according to a conventional technology. As shown in FIG. 1, the light emitting device includes a laser array light source 110, a collimating lens array 120, a focusing lens 130, a light homogenizing rod 140, a lens 150, and a phosphor wheel 160. FIG. 2 is a right side view of the laser array light source of FIG. 1. As shown in FIG. 2, the laser array light source is formed by multiple laser diodes forming an array. The laser array light source has a high power and can emit high brightness laser light. The collimating lens array 120 includes multiple collimating lens units, each collimating lens unit corresponding to a laser diode, to collimate the light emitted by the laser diode. To reduce the cross section of the light beam, the focusing lens 130 focuses the output light of the collimating lens array 120. The focused light is homogenized by the light homogenizing rod 140, and is them focused by the lens 150 onto the phosphor wheel 160 to generate a desired converted light.

However, because the focal length of the focusing lens 130 is relatively long, the length of the entire light emitting device is long, and its size is large.

SUMMARY

An object of the present invention is to provide a light emitting device that has a small size and can output high brightness and uniform light spot, and related projection system.

An embodiment of the present invention provides a light emitting device, which includes:

A laser array light source, including a non-emitting region and an emitting region formed by multiple laser elements;

A reflective light focusing system, including a focusing region and a non-focusing region, the focusing region focusing and reflecting an output light of the laser array light source;

A light collecting system, for collecting an output light of the reflective light focusing system and outputting it;

The light collecting system, the non-emitting region and the non-focusing region are located on a common straight line which is parallel to an optical axis of the output light of the laser array light source, and the light collecting system penetrates through the non-emitting region and/or the non-focusing region.

Preferably, the reflective light focusing system is a reflector cup, wherein a center region of the reflector cup is the non-focusing region, and a region other than the center region is the focusing region, wherein the light collecting system penetrates through the non-focusing region.

Preferably, the reflective light focusing system includes a reflector cup and a reflecting element, wherein the reflector cup includes a hollow region, the hollow region being the non-focusing region, and the region other than the hollow region and the reflecting element are the focusing region, and wherein the light collecting system penetrates through the hollow region of the reflector cup.

Preferably, the reflecting element is mounted on the non-emitting region of the laser array light source.

Preferably, the reflective light focusing system includes a reflecting element and a focusing lens having a hollow region, wherein the hollow region of the focusing lens is the non-focusing region, and the region of the focusing lens other than the hollow region and the reflecting element are the focusing region, wherein the region other than the hollow region of the focusing lens focuses the output light of the laser array light source, wherein the reflecting element reflects the output light of the focusing lens, and wherein the light collecting system penetrates through the hollow region of the focusing lens and the non-emitting region of the laser array light source.

Preferably, the reflecting element includes a convex reflecting surface or a concave reflecting surface, wherein the convex reflecting surface or concave reflecting surface reflects the output light of the reflective focusing system and focuses it.

Preferably, the light emitting device further includes a supplemental light source, wherein the supplemental light source is located on the same straight line as the non-emitting region and the non-focusing region, and is not located on the optical path of the output light of the laser array light source, and wherein the output light of the supplemental light source is incident on the light collecting system.

Preferably, the light collecting system includes a light homogenizing rod.

Preferably, the output port of the light homogenizing rod is located between the laser array light source and the reflective focusing system.

Preferably, the light collecting system further includes a lens or a transparent glass plate, the lens or transparent glass plate being mounted on the non-emitting region or the non-focusing region, wherein the output light from the light homogenizing rod penetrates through the non-emitting region or the non-focusing region and transmits through the lens or transparent glass plate.

Preferably, the light collecting system further includes a collimating lens, the collimating lens being confocal with the reflective light focusing system, wherein the collimating lens collimates the output light from the reflective light focusing system and outputs it to the light homogenizing rod.

Preferably, the light emitting device includes a collimating lens array, the collimating lens array including collimating lens units that correspond one to one with the laser elements of the laser array light source, wherein each of the laser elements of the laser array light source is located at a predetermined position on an optical axis of its corresponding collimating lens unit but off from a focal point of the collimating lens unit, so that an output light from the collimating lens unit has a predetermined divergence angle.

Another embodiment of the present invention provides a projection system, which includes the above light emitting device.

Compared to conventional technologies, embodiments of the present invention have the following advantages:

In embodiments of the present invention, the output light emitted from the emitting region of the laser array light source is reflected by the reflective light focusing system and focused to the light collecting system. Because of the reflection in the optical path, and because the light collection system, the non-emitting region and the non-focusing region are located on the same straight light parallel to the optical axis of the output light of the laser array light source, the light output from the light emitting device has to pass through the non-emitting region and/or the non-focusing region. Both the laser array light source and the reflective light focusing system have a finite size, but because the reflective light focusing system penetrates through the non-emitting region of the laser array light source and/or the non-focusing region of the reflective light focusing system, the laser array light source and/or the reflective light focusing system does not take up extra length, so the size of the light emitting device is reduced.

BRIEF DESCRIPTION OF THE DRAWINGS

FIG. 4 is a right side view of the laser array light source of FIG. 3a.

FIG. 6 is a right side view of the laser array light source of FIG. 5a.

FIG. 8 is a right side view of the focusing lens 431 of FIG. 7a.

DETAILED DESCRIPTION OF PREFERRED EMBODIMENTS

Embodiments of the present invention are described below in detail with reference to the drawings.

Figure 1:
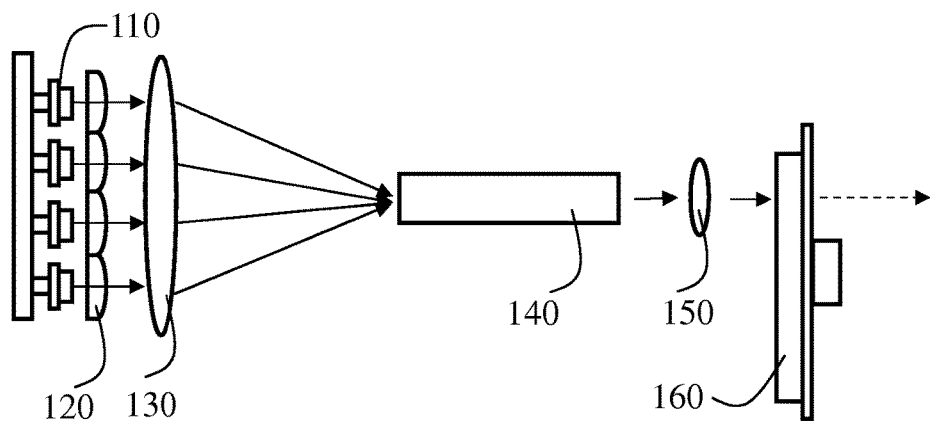
FIG. 1 illustrates a light emitting device according to a conventional technology.
Figure 2:
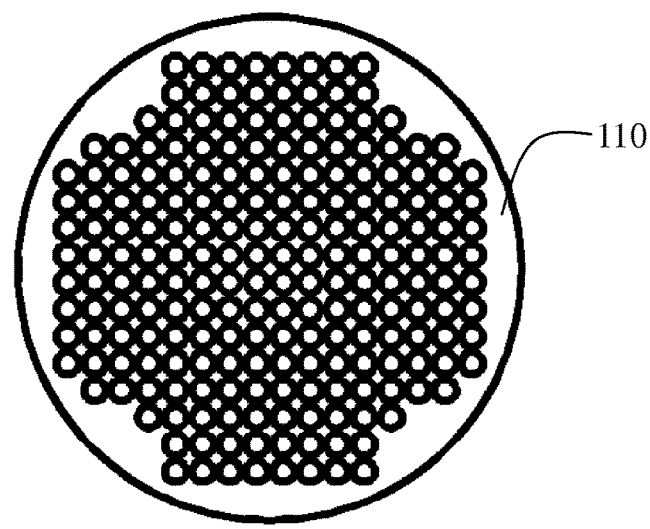
FIG. 2 is a right side view of the laser array light source of FIG. 1.
Figure 3A:
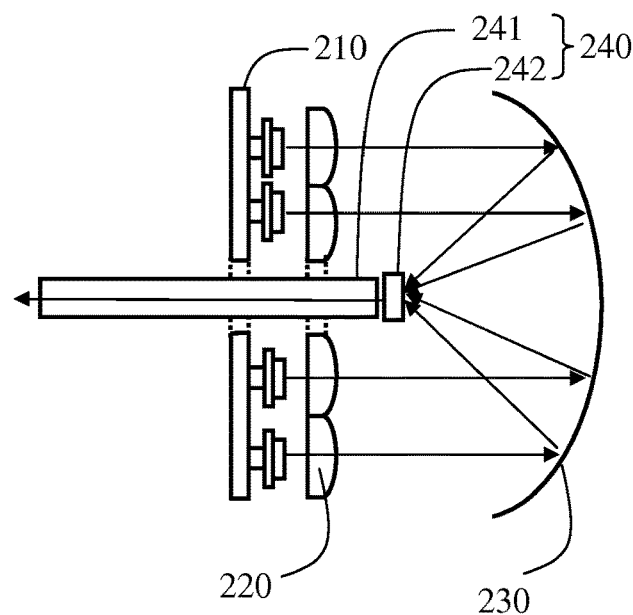
FIG. 3a schematically illustrates the structure of a light emitting device according to an embodiment of the present invention.

FIG. 3a schematically illustrates the structure of a light emitting device according to an embodiment of the present invention. As shown in FIG. 3a, the light emitting device includes a laser array light source 210, a collimating lens array 220, a reflective light focusing system 230, and a light collecting system 240.

Figure 4:
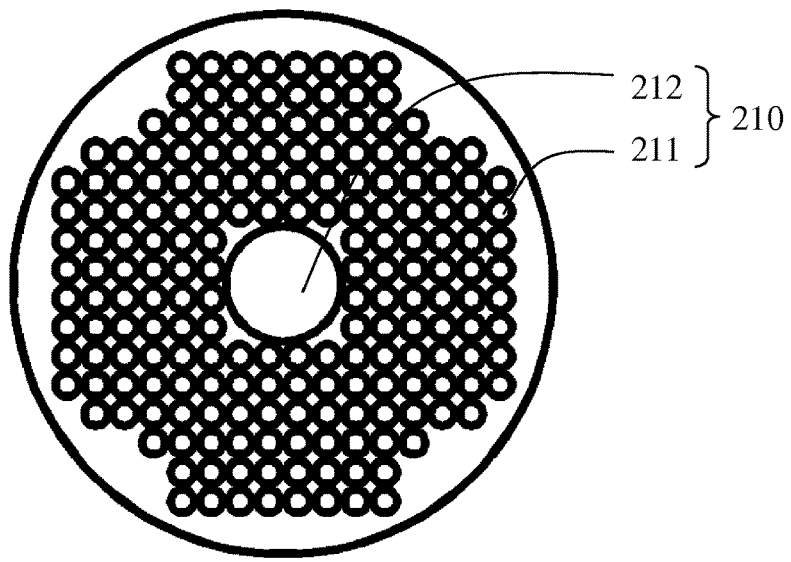

The laser array light source 210 includes multiple laser elements. The laser elements may be laser diodes. Laser diodes can emit light having high energy density and very low divergence angles, i.e. a near parallel light. Because they can provide high brightness output light, they are preferred light sources for high brightness light emitting devices. FIG. 4 is a right side view of the laser array light source of FIG. 3a. As shown in FIG. 4, the laser array light source 210 includes a round shaped hollow region at its center, where the hollow region is a non-emitting region 212 and the region other than the hollow region is an emitting region 211. The laser elements are disposed in the emitting region 211.

Although a laser light has relatively good collimation, it still has a certain divergence angle, so through its propagation the cross-section of the light beam will increase and its brightness will decrease. Therefore, the light emitted by the laser array light source 210 is collimated by the collimating lens array 220 and then output. Corresponding to the laser array light source 210, the collimating lens array 220 also includes a hollow region; this hollow region and the non-emitting region 212 of the laser array light source are located on the same straight line that is parallel to the optical axis. The non-hollow region of the collimating lens array 220 covers the emitting region 211 of the laser array light source, to collimate the light emitted by the laser array light source 210. However, with the divergence angle of the laser light is small and negligible, or when the requirement for the divergence angle of the laser light is not very high, the collimating lens array 220 may be omitted.

As shown in FIG. 4, to realize a high power light emitting device, tens or even hundreds of laser elements may be arrayed in the emitting region 211 of the laser array light source 210, so the size of the emitting area of the laser array light source may be large. To compress the cross section of the light beam for the benefit of downstream optical process, the light emitting device is provided with the reflective light focusing system 230. In this embodiment, the reflective light focusing system 230 is a reflector cup. A center region of the reflector cup covers, in the direction of the optical axis, the non-emitting region of the laser array light source 210, so it will not receive any incident light, and therefore constitutes a non-focusing region. The region other than the center region is a focusing region, which covers, in the direction of the optical axis, the emitting region of the laser array light source 210, and focuses and reflects the light incident onto this region. The reflector cup may be made of an aluminum reflector, or a concave mirror coated with a reflective film.

To collect the light output from the reflective light focusing system 230, the light emitting device further includes the light collecting system 240. The light collecting system 240 includes a light homogenizing rod 241, which collects the light output from the reflective light focusing system 230 and homogenizes it. The light homogenizing rod 241 penetrates through the non-emitting region 212 of the laser array light source, and the light output plane of the light homogenizing rod 241 protrudes out of the laser array light source 210, and constitutes the output port of the light emitting device.

Further, the light homogenizing rod 241 can perform de-coherence function for the laser light. This is because, although the light emitted by the laser diodes has fixed polarization, when multiple laser beams with different polarizations are mixed, the polarization can be partially eliminated. Here, the structure of the light homogenizing rod may be a solid rod or a hollow rod, and its shape may be a square rod or a cone shaped rod. The aspect ratio of the light homogenizing rod may be designed based on need; preferably, the aspect ratio is 16:9 or 4:3, to meet the requires of various light modulators of projection systems.

Moreover, in other embodiments of the present invention, the light collecting system 240 may alternatively use a fly-eye lens pair to replace the light homogenizing rod, which also has the effect of light collection and light homogenization.

To ensure proper light output, the light collecting system 240, the non-emitting region 212 of the laser array light source 210 and the non-focusing region of the reflective light focusing system 230 are located on a common straight line which is parallel to the optical axis of the output light of the laser array light source 210, and the output light of the reflective light focusing system 230 is collected by the light collecting system 240 and travels in the direction toward the non-emitting region of the laser array light source 210. In this embodiment, because the light homogenizing rod 241 penetrates through the non-emitting region 212 of the laser array light source 210, the laser array light source 210 and the collimating lens array 220 do not take up extra length, which reduces the size of the light emitting device.

Therefore, the light emitting device according to this embodiment can output high power, uniform light and has a relatively small size. The light emitting device can be used in ultra-high brightness laser projection systems. For example, the laser array light source in this embodiment may be a red laser light source, a green laser light source, or a blue laser light source, which can be used as light sources of projection systems.

It should be noted that the non-emitting region 212 of the laser array light source and the hollow region of the collimating lens array 220 do not have to have a round shape; their shapes can be designed according to practical needs, as long as they allow the light homogenizing rod 241 to penetrate through. Also, the non-emitting region 212 of the laser array light source, the hollow region of the collimating lens array 220, and the non-focusing region of the reflective light focusing system 230 do not have to be located in the center region of the respective devices; the reflective light focusing system 230 can be designed to change the location of the focal point it forms after reflecting and focusing the incident light, so that the focal point is not located in the center region. In this situation, it is only required that the non-emitting region 212 of the laser array light source, the hollow region of the collimating lens array 220, the non-focusing region of the reflective light focusing system 230 and the point that the light is focused to are located on the same straight line which is parallel to the optical axis of the output light of the laser array light source.

1 Because the light emitted by the laser is well collimated, the output light of the laser array light source 210 is formed by multiple small light beams, each small light beam corresponding to a laser element. After being focused by the reflective light focusing system 230, the multiple small light beams are focused toward one point, but the internal divergence angle of each small light beam is still small; it is equivalent to a proportional reduction of the light distribution on the output surface of the laser array light source 210. In this situation, the light homogenizing rod 241 cannot effectively homogenize the light. Therefore, the light collecting system 240 is provided with a scattering element 242, which may be a scattering plate. The scattering plate 242 is disposed between the light homogenizing rod 241 and the reflective light focusing system 230, and coincides with the focal point of the reflective light focusing system 230. It scatters the incident light to increase the internal divergence angle of each small light beam, which improves the light homogenizing effect of the light homogenizing rod 241, and also has a de-coherence effect for the laser.

Because the output power of the laser array light source 210 is relatively high, the light emitting device may further include a drive device (not shown in the drawings), to drive the scattering plate 242 to move, such as to rotate, so that the laser light spot formed on the scattering plate 242 moves on the scattering plate 242 along a predetermined path. Thus, the heat generated by the light spot is spread over an area of the scattering 242, preventing the scattering element 242 from being burned. Moreover, a stationary scattering plate 242 has relatively poor de-coherence effect. This is because the scattering materials are not ideal, and cannot scatter 100% of the incident light; moreover, it also needs to ensure a certain light transmission rate. As a result, the projected light spot formed by the light emitting device will still have interference spots. When the drive device is provided, the scattering plate 242 motes, so the position of the light spot on the scattering plate 242 changes with time; in turn, the locations of the interference spots in the projected light spot change with time. When this change occurs at a sufficiently fast rate, the human eyes cannot detect the interference spots, and therefore a better de-coherence effect is achieved.

Further, the scattering plate 242 may be replaced by a fly-eye lens pair, where each lens unit in the fly-eye lens pair can de-collimate the incident light by a certain degree. Similarly, a drive device can be provided to drive the fly-eye lens pair to mode, to improve heat dissipation. Also, to further improve high temperature resistance, the scattering plate or the fly-eye lens pair is preferably formed of a glass material.

The transmission rate of the scattering plate is not high; to increase the transmission rate, the scattering plate 242 may be replaced by a concave lens, disposed between the reflective light focusing system 230 and the focal point of the reflective light focusing system 230, where the concave lens and the reflective light focusing system 230 are confocal. Even after the laser light is collimation by the collimating lens array 220, the small light beam corresponding to each laser diode still has a small divergence angle. The light output from the reflective light focusing system 230 is collimated by the concave lens; here, collimation means the different small light beams become parallel to each other, while the internal divergence angle of the small light beams are actually increased. This is because the light spot formed by the concave lens is much smaller than the light output surface of the laser array light source 210; because of the conservation of etendue, the divergence angle will increase. For example, if the size of the light beam is compressed by the concave lens to one tenth of the size of the light output surface of the laser array light source 210, then the divergence angle of the small light beams will be ten times their original value. Therefore, the concave lens has the effect of diverging the small light beams within the incident laser light. It should be noted that, if the scattering plate 242 is replaced by a convex lens, then the convex lens is located between the light homogenizing rod 241 and the focal point of the reflective light focusing system 230, and the convex lens and the reflective light focusing system 230 are confocal. Such a convex lens can also collimate the incident laser light and increase the diverge angle of the small light beams inside the laser.

To further improve the light homogenization effect, the laser elements of the laser array light source 210 may be positioned to be off focus from the lenses of the collimating lens array 220, i.e., each laser element of the laser array light source 210 is located on the optical axis of the corresponding collimating lens unit of the collimating lens array but at a predetermined point which is spaced away from the focal point of the collimating lens unit. This gives the small light beams a predetermined divergence angle. This way, without significantly changing the overall size of the output light beam, the light homogenizing effect of the light homogenizing rod 241 is improved. In practical applications, the predetermined divergence angle is within 4 degrees; such a value does not cause the overall light beam to have an overly large divergence angle, but can improve the light homogenizing effect of the light homogenizing rod 241.

Compared to the scattering plate and the fly-eye lens, concave and convex lenses are easier to make using glass materials; they have low cost and better temperature resistance, so they are preferred designs.

Figure 3B:
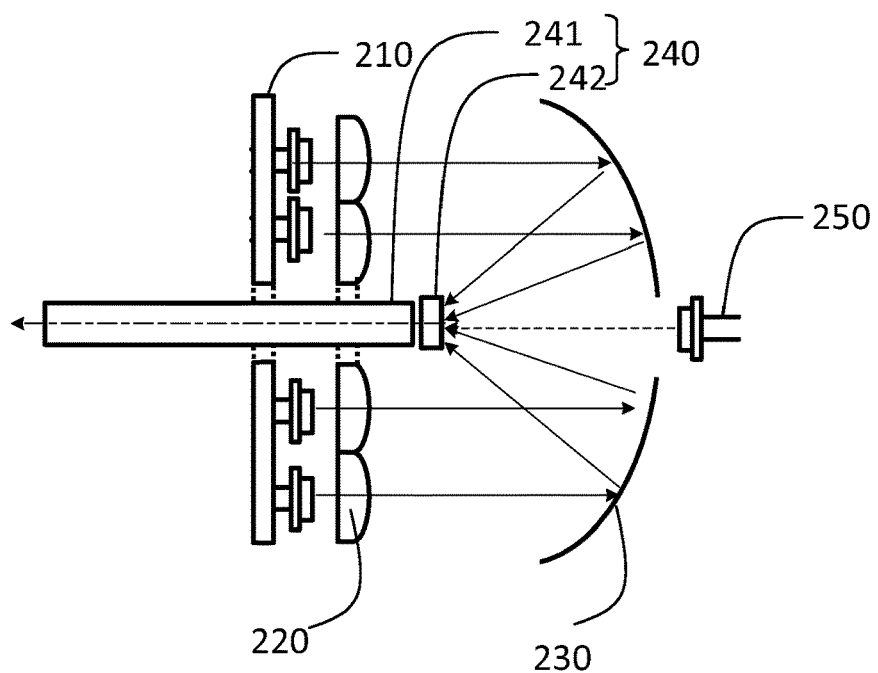
FIG. 3b schematically illustrates the light emitting device of FIG. 3a with a supplemental light source.

It should be noted that in other implementations of this embodiment, a supplemental light source may be added to the light emitting device shown in FIG. 3a. FIG. 3b schematically illustrates the light emitting device of FIG. 3a with a supplemental light source. As shown in FIG. 3b, the light emitting device additionally includes a supplemental light source 250, which is located on the same straight line as the non-emitting region of the laser array light source 210 and the non-focusing region of the reflective light focusing system 230; it and the laser array light source 210 are located on two different sides of the reflective light focusing system 230, and it is not located on the output light path of the laser array light source 210, so the supplemental light source 250 will not block the output light of the laser array light source 210.

To ensure that the output light from the supplemental light source 250 enters the light collecting system 240, the non-focusing region of the reflective light focusing system 230 is a hollow region. This way, the output light of the supplemental light source 250 transmits through the non-focusing region of the reflective light focusing system 230 to be incident on the scattering plate 242 of the light collecting system 240. Of course, the non-focusing region of the reflective light focusing system 230 can be other than a hollow region; in this case, the supplemental light source 250 can be mounted on the non-focusing region, as long as it does not block the output light from the laser array light source 210. In such a situation, preferably, the non-emitting region is a plane, which is convenient for mounting the supplemental light source.

Here, the supplemental light source 250 is a laser light sources, but of course it may also be a LED light source or other types of light source. Also, the supplemental light source 250 and the laser array light source 210 may emit light of the same wavelength, to increase the brightness of the light emitting device. Or, they can emit light of different wavelengths; for example, the supplemental light source 250 may emit a 462 nm blue light and the laser array light source 210 may emit a 445 nm blue light, or the supplemental light source 250 may emit a red light while the laser array light source 210 may emit a blue light.

Second Embodiment

Figure 5A:
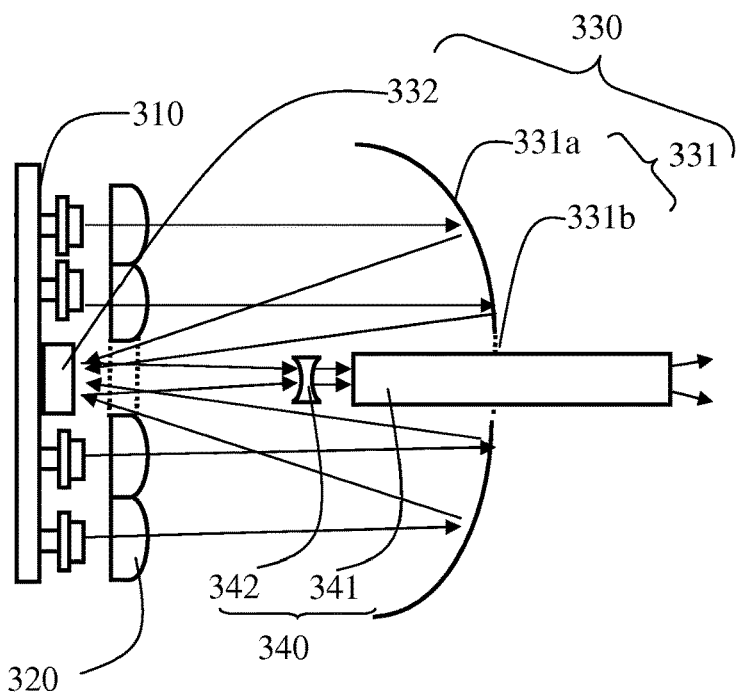
FIG. 5a schematically illustrates the structure of a light emitting device according to another embodiment of the present invention.
Figure 6:
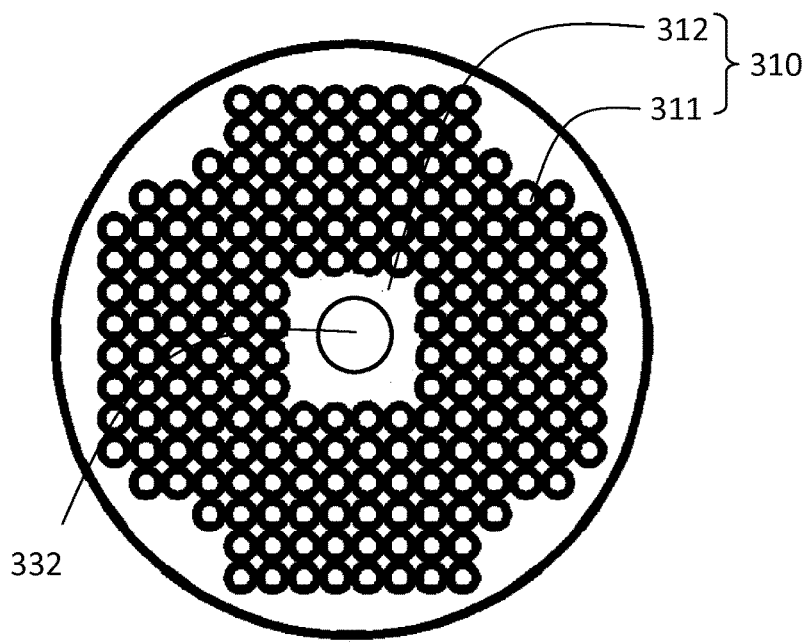

FIG. 5a schematically illustrates the structure of a light emitting device according to another embodiment of the present invention. As shown in FIG. 5a, the light emitting device includes a laser array light source 310, a collimating lens array 320, a reflective light focusing system 330, and a light collecting system 340. The light collecting system 340 includes a concave lens 342 and a light homogenizing rod 341. FIG. 6 is a right side view of the laser array light source of FIG. 5a. As shown in FIG. 6, the laser array light source 310 includes an emitting region 311 and a non-emitting region 312.

Differences between the light emitting device of this embodiment and that of FIG. 3 include:

In the embodiment of FIG. 3, because the light output surface of the laser array light source 210 is large, the size of the reflector cup 230 also needs to be sufficiently large in order to completely collect the output light of the laser array light source 210, which makes the focal length of the reflector cup 230 long and thus the size of the light emitting device large. To further reduce the size of the light emitting device, in this embodiment, the reflective light focusing system 330 includes a reflector cup 331 and a reflecting element 332. The reflector cup 331 includes a hollow region 331b, which is the non-focusing region, and the region other than the hollow region 331b is the focusing region 331a. The focusing region 331a reflects the light output from the collimating lens array 320 and focuses it.

In this embodiment, the reflecting element 332 is a reflecting mirror. The reflecting mirror 332 is located between the reflector cup 331 and the focal point of the reflector cup 331, and is perpendicular to the optical axis of the output light of the reflector cup 331. The reflecting mirror 332 reflects the light output from the reflector cup 331, while maintaining the focusing of the reflected light. This way, by the cooperation of the reflector cup 331 and the reflecting mirror 332, the focusing of the light occurs in two optical path segments, and the two optical path segments overlap each other in space, which shortens the optical path required to focus the output light from the laser array light source 310, and reduces the size of the light emitting device. Advantages of the reflecting mirror is its simple structure and low cost.

After twice reflected by the reflector cup 331 and the reflecting mirror 332, the light reflected by the reflecting mirror 332 travels toward the reflector cup 331. To ensure that the light reflected by the reflecting mirror 332 can be output, the light homogenizing rod 341 of the light collecting system 340 penetrates through the hollow region 331b of the reflector cup (i.e. the non-focusing region of the reflective light focusing system 330).

Further, because the reflecting mirror 332 is relatively close to the laser array light source 310, as shown in FIG. 6, the reflecting mirror 332 can be mounted on the non-emitting region of the laser array light source 310, to solve the problem caused by mounting a suspended reflecting mirror 332.

However, in this embodiment, when the position of the reflecting mirror 332 is maintained unchanged, its focal point for the reflected light is also fixed. In other embodiments, the reflecting element 332 may use a concave lens or a convex lens, where the concave lens or convex lens has a reflecting surface (e.g., by coating its surface with a reflective film). As compared to a reflecting mirror, light reflected by a convex lens can be focused at a closer location, and light reflected by a concave lens can be focused at a farther away location, and the curved surface of the concave lens or convex lens can be designed based on need to control the distance of the focal point of the reflected light. This way, by selecting a reflecting mirror, a concave lens or a convex lens, the location of the focal point of the reflected light can be controlled.

Further, because the size of the reflector cup 331 is large, its reflected light may have significant aberration, which cannot be eliminated by designing the curved surface of the reflector cup 331 alone; but the reflector cup 331 and the reflecting surface of the concave lens or convex lens can cooperate with each other to eliminate aberration. Therefore, when cost is not a great concern, the concave lens having a concave reflecting surface or the convex lens having a convex reflecting surface is a preferred solution. It should be noted that the concave lens having a concave reflecting surface can be replaced by a reflective aluminum plate having a concave reflecting surface, which can achieve the same effect; similarly, the convex lens having a convex reflecting surface can be replaced by a reflective aluminum plate having a convex reflecting surface.

It should also be noted that in this embodiment, the output plane of the light homogenizing rod 341 protrudes out from the hollow region of the reflector cup 331, which is beneficial for clamping and mounting the light homogenizing rod 341. In other implementations of the embodiment, the reflective light focusing system 330 and the light collecting system 340 can be adjusted so that the output plane of the light homogenizing rod 341 is located right at the hollow region of the reflector cup 331, which can make the overall structure of the light emitting device more compact. In this situation, the output plane of the light homogenizing rod 341 can be covered with a transparent glass plate, so as to form a closed space to prevent dust from entering. Of course, the reflective light focusing system 330 and the light collecting system 340 can also be adjusted such that the output plane of the light homogenizing rod 341 is located between the reflector cup 331 and the laser array light source 310. In this situation, the light collecting system 340 can further includes a lens, which or focuses the output light from the light homogenizing rod 341 and provide it to downstream optical elements. This lens can be mounted at the hollow region 331b of the reflector cup 331, so that the overall structure of the light emitting device is compact.

The above structure can also be applied to the light emitting device of the embodiment of FIGS. 3a and 3b and later embodiments. Take the embodiment of FIG. 3a as an example, in the light emitting device, the reflective light focusing system 230 and the light collecting system 240 can be adjusted such that the output plane of the light homogenizing rod 241 is located at the non-emitting region of the laser array light source 210, and a glass plate is provided at the output plane of the light homogenizing rod 241; or such that the output plane of the light homogenizing rod 241 is located between the laser array light source 210 and the reflector cup 230, and a lens is mounted in the non-emitting region of the laser array light source 210. Both designs can achieve a compact structure of the light emitting device. However, because the back side of the substrate of the laser array light source 210 often has a heat dissipating device, it may be difficult to implement it on this side; on the other hand, if the a liquid cooling is used for heat dissipation, then the substrate of the 210 does not need a heat dissipation device, and can be simply provided with a heat dissipation plate, so the above structure can be more easily implemented.

Figure 5B:
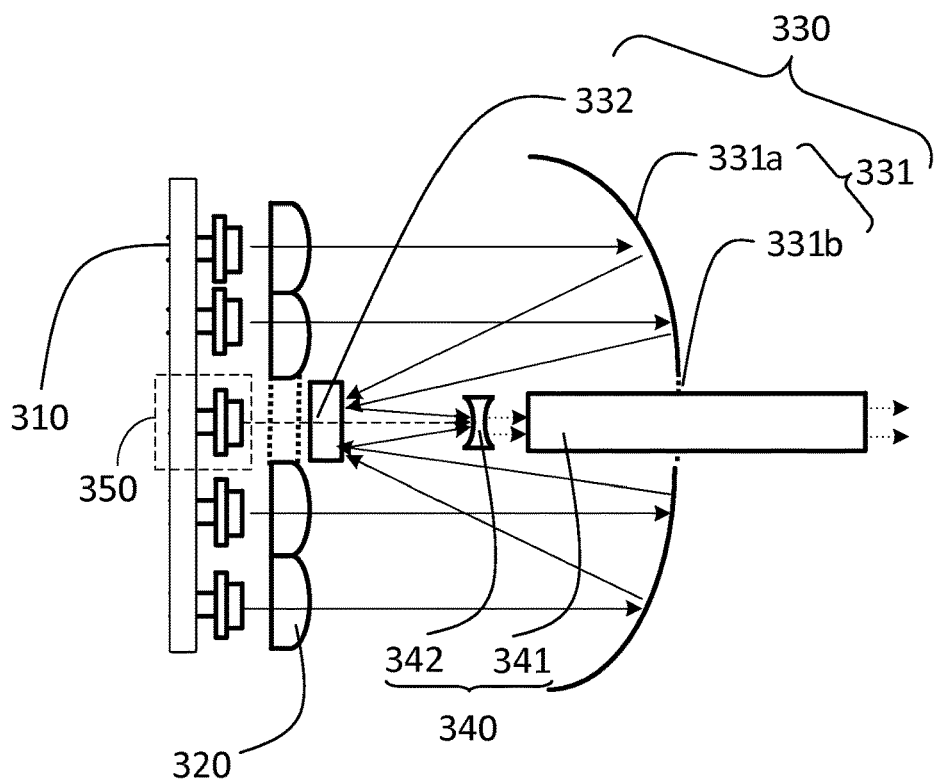
FIG. 5b schematically illustrates the light emitting device of FIG. 5a with a supplemental light source.

Similar to the embodiment of FIG. 3a, the light emitting device in FIG. 5a can also be provided with a supplemental light source. FIG. 5b schematically illustrates the light emitting device of FIG. 5a with a supplemental light source. As shown in FIG. 5b, the light emitting device additionally includes a supplemental light source 350, which is located on the same straight line as the non-emitting region of the laser array light source 310 and the non-focusing region of the reflective light focusing system 330. Specifically, the supplemental light source 350 is mounted on the non-emitting region of the laser array light source 310. In such a case, the reflecting mirror 332 of the reflective light focusing system 330 cannot be mounted on the non-emitting region of the laser array light source 310, but should be located on the output light path of the supplemental light source 350. Preferably, the reflecting mirror 332 is mounted on the hollow region of the collimating lens array 320.

To ensure that the output lights from the laser array light source 310 and the supplemental light source 350, after the reflecting mirror 332, both enter the light collecting system 340, in FIG. 5b, the reflecting mirror 332 is not an ordinary reflecting mirror, but rather a wavelength selective filter plate. Correspondingly, the laser array light source 310 and the supplemental light source 350 output lights of different wavelengths, which are respectively reflected and transmitted by the wavelength selective filter plate 332 to enter the light collecting system 340. Alternatively, the reflecting mirror 332 may also be a polarizing filter plate, and correspondingly, the laser array light source 310 and the supplemental light source 350 output lights of different polarizations, which are respectively reflected and transmitted by the polarizing filter plate 332 to enter the light collecting system 340. As another alternative, the reflecting mirror 332 may also be an angle selective filter plate, and because the light from the laser array light source 310 and light from the supplemental light source 350 are incident on the reflecting mirror 332 at different angles, they are respectively reflected and transmitted by the reflecting mirror. In short, the lights output by the laser array light source 310 and the supplemental light source 350 have certain different optical properties, and the reflecting mirror 332 can respectively reflect and transmit these lights based on these different optical properties.

Third Embodiment

Figure 7A:
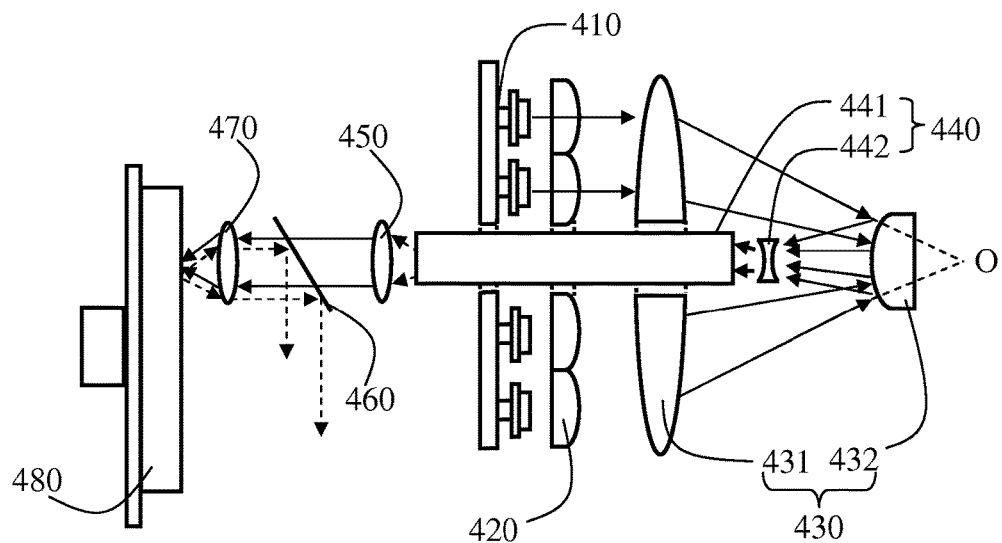
FIG. 7a schematically illustrates the structure of a light emitting device according to another embodiment of the present invention.

FIG. 7a schematically illustrates the structure of a light emitting device according to another embodiment of the present invention. As shown in FIG. 7a, the light emitting device includes a laser array light source 410, a collimating lens array 420, a reflective light focusing system 430, and a light collecting system 440. The light collecting system 440 includes a light homogenizing rod 441 and a concave lens 442.

Figure 8:
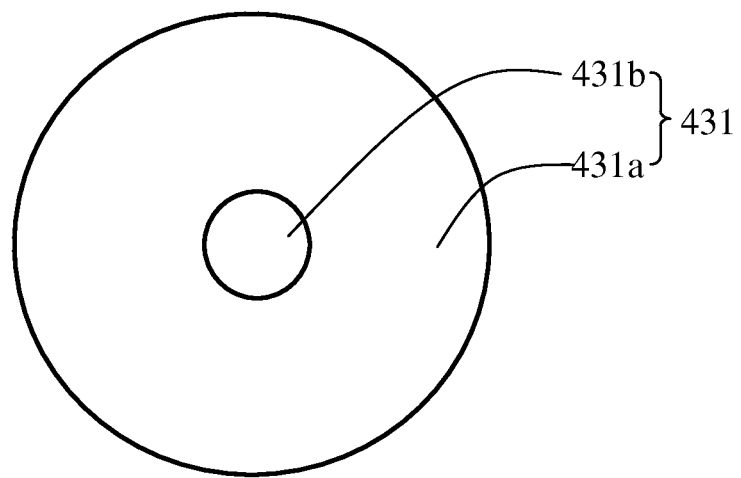

Compared to the light emitting device in the embodiment of FIG. 5a, the differences of this embodiment include:

(1) The reflective light focusing system 430 in this embodiment includes a focusing lens 431 and a reflecting element 432. FIG. 8 is a right side view of the focusing lens 431 of FIG. 7a. As shown in FIG. 8, the focusing lens 431 is a convex lens having a hollow region 431b, which is the non-focusing region. The region other than the hollow region 431b and the reflecting element 432 constitute the focusing region. The focusing region focuses the output light form the laser array light source 410, to reduce the cross section of the laser light.

Similar to the reflecting cup in the embodiment of FIG. 5a, the size of the focusing lens 431 also needs to be sufficiently large in order to completely collect the output light of the laser array light source 410. The focal length of a convex lens depends on its size; the larger the size, the longer the focal length. Thus, the focal length of the focusing lens 431 is long.

In this embodiment, the reflecting element 432 is a convex lens having a convex reflecting surface (e.g., by coating the surface of the convex lens). The convex lens 432 is located between the focusing lens 431 and the focal point O of the focusing lens 431, and the convex reflecting surface reflects the output light from the focusing lens 431, while maintaining the focusing of the reflected light. This way, by the cooperation of the focusing lens 431 and the convex lens 432, the focusing of the light occurs in two optical path segments, and the two optical path segments overlap each other in space. Thus, the reflective light focusing system of this embodiment shortens the optical path required to focus the output light from the laser array light source, and reduces the size of the light emitting device.

Moreover, to ensure that the light reflected from the convex lens 432 can be output, the optical axis of the reflected light faces the hollow region of the focusing lens 431. The light homogenizing rod 441 of the light collecting system 440 penetrates through the hollow region 431b of the focusing lens 431 (the non-focusing region of the reflective light focusing system), the non-emitting region of the laser array light source 410, and the hollow region of the collimating lens array 420. This way, the light output from the focusing lens 431 is reflected by the convex lens 432, and sequentially passes through the hollow region 431b of the focusing lens 431, the hollow region of the collimating lens array 420, and the non-emitting region of the laser array light source 410, to be ultimately output.

(2) In this embodiment, the light emitting device further includes a wavelength conversion device 480. When the wavelength conversion material is directly excited by a high power excitation light, high heat is generated. In particular, the laser light has a Gauss distribution, and the light spot it forms on the surface of the wavelength conversion material is not uniform, which may cause a drop in the light emitting efficiency of the wavelength conversion materials. In this embodiment, the laser light emitted from the light homogenizing rod 441 is more uniform, which helps to improve the light emitting efficiency of the wavelength conversion materials.

Specifically, the light from the light homogenizing rod 441 is incident on the lens 450, is collimated by it and then incident onto the filter plate 460. The filter plate 460 transmits the laser light and reflects the converted light output from the wavelength conversion device 480. For example, a blue laser excitation light may excite a yellow phosphor to generate a yellow converted light, and the filter plate transmits blue light but reflects yellow light. The laser light transmits through the filter plate 460, and is focused by the lens 470 onto the wavelength conversion device 480, to excite the wavelength conversion material to generate the converted light. The converted light is collimated by the lens 470 and then incident on the filter plate 460 and is reflected by it, so that the light emitting device outputs a high brightness converted light.

In other embodiments of the present invention, the light emitted by the wavelength conversion device can be mixed with light from another light source. For example, the yellow converted light can be mixed with the output light of another blue light source to obtain a white light.

Figure 7B:
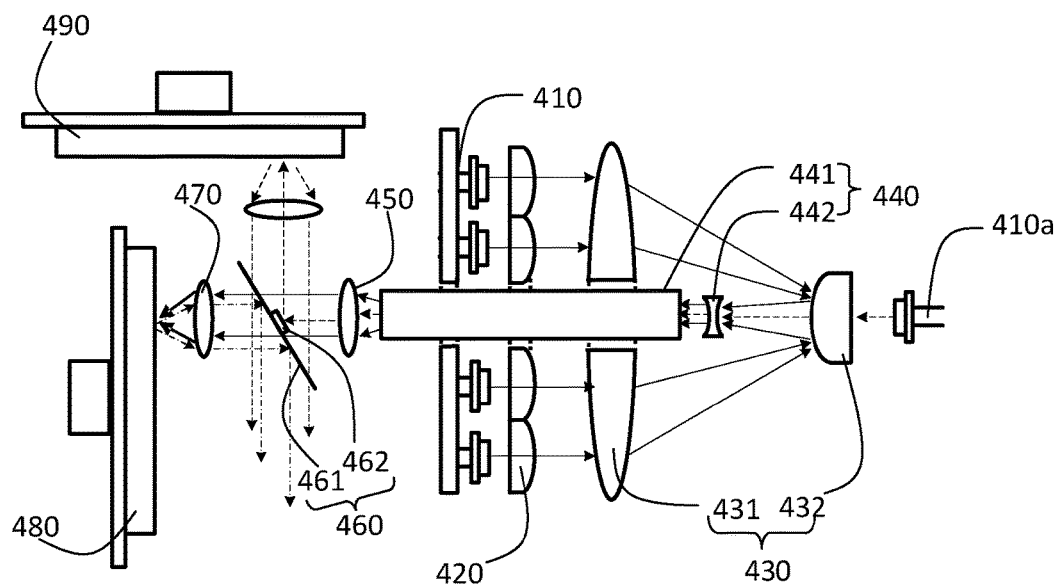
FIG. 7b schematically illustrates the light emitting device of FIG. 7a with a supplemental light source.

Similarly, the light emitting device in FIG. 7a can also be provided with a supplemental light source. FIG. 7b schematically illustrates the light emitting device of FIG. 7a with a supplemental light source. As shown in FIG. 7b, the light emitting device additionally includes a supplemental light source 410a, which is located on the same straight line as the non-emitting region of the laser array light source 410 and the non-focusing region of the reflective light focusing system 430. Specifically, the supplemental light source 410a and the laser array light source 410 are located on two different sides of the reflective light focusing system 430.

Here, the convex lens 432 of the reflective light focusing system 430 is coated on its surface with a filter film. The thin film may be a wavelength selective filter plate, and correspondingly, the laser array light source 410 and the supplemental light source 410a output lights of different wavelengths, which are respectively reflected and transmitted by the convex lens 432. Alternatively, the filter film on the surface of the convex lens 432 may be a polarizing filter film, and correspondingly, the laser array light source 410 and the supplemental light source 410a output lights of different polarizations, which are respectively reflected and transmitted by the convex lens 432. As another alternative, the filter film on the surface of the convex lens 432 may also be an angle selective filter film, and because the light from the laser array light source 410 and from the supplemental light source 410a are incident on the coated surface of the convex lens 432 at different angles, they are respectively reflected and transmitted by the convex lens. In short, the lights output by the laser array light source 410 and the supplemental light source 410a have certain different optical properties, and the convex lens 432 can respectively reflect and transmit these lights based on these different optical properties. This way, the light output from the supplemental light source 410a will transmit through the convex lens 432, and enters the light collecting system 440 together with the output light of the laser array light source 410 that has been reflected by the convex lens 432.

Specifically, the laser array light source 410 and the supplemental light source 410a are both laser light sources, and the output light of each of them is formed of multiple small light beams, each small light beam being emitted by one laser element. The small light beams are parallel to each other, and each small light beam has an internal divergence angle.

Because the light emitting surface area of the laser array light source 410 is much larger than that of the supplemental light source 410a, while the divergence angles of their output light are similar, the etendue of the light output from the laser array light source 410 is much larger than that of the supplemental light source 410a. After the output lights of the laser array light source 410 and the supplemental light source 410a are homogenized by the light homogenizing rod 441, the sizes of the two light spots formed by them on the output plane of the light homogenizing rod 441 are the same; because of the conservation of etendue, the divergence angle of the light originating from the laser array light source 410 is much larger than that of the light originating from the supplemental light source 410a. Thus, when the output lights of the light homogenizing rod 441 are collimated by the lens 450, the cross section of the light beam originating from the laser array light source 410 is much larger than that of the light beam originating from the supplemental light source 410a. Therefore, the output light originating from the laser array light source 410 and the output light originating from the supplemental light source 410a can be separated using their etendue difference and treated respectively.

Specifically, the filter plate 460 in FIG. 7a is replaced with a light separation element 460 in FIG. 7b, and a scattering device 490 is additionally provided. As shown in FIG. 7b, the light separation element 460 includes a filter plate 461 and a small reflecting mirror 462 disposed at the center of the filter plate 461. The small reflecting mirror 462 may be a mirror reflector, a wavelength selective filter plate, or a polarization plate. As shown in FIG. 7b, the filter plate 461 transmits the output light of the laser array light source 410 and the output light of the supplemental light source 410*a*, while reflect the converted light emitted by the wavelength conversion device 480.

The output light from the supplemental light source 410*a* is incident on the small reflecting mirror 462 and reflected to the scattering device 490. The Gaussian distribution of the laser becomes a Lambertian distribution after scattering, with a larger etendue, so a majority of the output light from the scattering device 490 transmits through the filter plate 461 and a small portion is reflected by the small reflecting mirror 462 and become lost. A majority of the light originating form the laser array light source 410 transmits through the filter plate 461 and is incident on the wavelength conversion device 480, where it is absorbed and converted to the converted light, while a small portion is reflected by the small reflecting mirror 462 to the scattering device 490. The converted light emitted by the wavelength conversion device 480 is incident on the filter plate 461 and is reflected by it, so that the converted light and the output light of the scattering device 490 are combined into one light beam for output.

In this embodiment, the light separation element 460 separates the light originating from the laser array light source 410 and the light originating from the supplemental light source 410*a* based on their etendue difference. In practice, the light emitting device can also separate the lights using a filter plate with an aperture. In such a case, the positions of the wavelength conversion device 480 and scattering device 490 should be swapped, and the filter plate should reflect the lights originating from the laser array light source 410 and the supplemental light source 410*a* and transmit the converted light emitted by the wavelength conversion device 480.

The light originating from the supplemental light source 410*a* will be incident on the aperture of the filter plate and will pass through it to reach the scattering device 490. The Gaussian distribution of the laser becomes a Lambertian distribution after scattering, with a larger etendue, so a majority of the output light from the scattering device 490 is reflected by the filter plate, and a small portion passes through the aperture and become lost. A majority of the light originating form the laser array light source 410 is reflected by the filter plate 461 to the wavelength conversion device 480, where it is absorbed and converted to the converted light, while a small portion passes through the aperture to the scattering device 490. The converted light emitted by the wavelength conversion device 480 is incident on the filter plate and transmits through it, so that the converted light and the output light of the scattering device 490 are combined into one light beam for output.

Further, it should be noted that the light homogenizing rod 441 can be replaced by a fly-eye lens pair. In this situation, the size of the light spot formed on the coated surface of the convex lens 432 by the light from the supplemental light source 410*a* should be made smaller than that of the light spot formed by the light from the laser array light source 410. This way, of the light spots formed on the fly-eye lens pair by the collimated light beams from the concave lens 442, the size of the light spot formed by the light originating from the supplemental light source 410*a* will be smaller than that formed by the light originating from the laser array light source 410. The fly-sys lens pair does not change the size ratio of the above light spots formed by the light originating from the supplemental light source 410*a* and the light originating from the laser array light source 410. Therefore, on the surface of the light separation element 460, the size of the light spot formed by the light originating from the supplemental light source 410*a* is smaller than that of the light spot formed by the light originating from the laser array light source 410, so the two lights can be separated based on their etendue difference.

The various embodiments in this disclosure are described in a progressive manner, where each embodiment is described by emphasizing its differences from other embodiments. The common or similar features of the embodiments can be understood by referring to each other.

Embodiments of the present invention also provide a projection system, including a light emitting device which has the structures and functions of the light emitting device of the above described embodiments. The projection system may employ various projection technologies, such as liquid crystal display (LCD) projection technology, digital light processor (DLP) projection technology, etc.

The above descriptions disclose the embodiments of the present invention, but do not limit the scope of the invention. Thus, it is intended that the present invention cover modifications and variations that come within the scope of the appended claims and their equivalents, as well as direct or indirect applications of the embodiments in other related technical fields.

What is claimed is:

1. A light emitting device, comprising:
    a laser array light source, including a non-emitting region and an emitting region formed by multiple laser elements;
    a reflective light focusing system, including a focusing region and a non-focusing region, the focusing region focusing and reflecting an output light of the laser array light source; and
    a light collecting system, for collecting an output light of the reflective light focusing system and outputting it;
    wherein the light collecting system, the non-emitting region and the non-focusing region are located on a common straight line which is parallel to an optical axis of the output light of the laser array light source, and wherein the light collecting system penetrates through the non-emitting region and/or the non-focusing region,
    wherein the reflective light focusing system includes a reflector cup, wherein a center region of the reflector cup is the non-focusing region, and a region other than the center region is the focusing region, wherein the light collecting system penetrates through the non-focusing region.

2. The light emitting device of claim 1, where the reflective light focusing system further includes a reflecting element, wherein the center region of the reflector cup is a hollow region.

3. The light emitting device of claim 2, wherein the reflecting element is mounted on the non-emitting region of the laser array light source.

4. The light emitting device of claim 2, wherein the reflecting element includes a convex reflecting surface or a concave reflecting surface, wherein the convex reflecting surface or concave reflecting surface reflects an output light of the reflective focusing system and focuses it.

5. A light emitting device, comprising:
    a laser array light source, including a non-emitting region and an emitting region formed by multiple laser elements;
    a reflective light focusing system, including a focusing region and a non-focusing region, the focusing region focusing and reflecting an output light of the laser array light source; and a light collecting system, for collecting an output light of the reflective light focusing system and outputting it;

wherein the light collecting system, the non-emitting region and the non-focusing region are located on a common straight line which is parallel to an optical axis of the output light of the laser array light source, and wherein the light collecting system penetrates through the non-emitting region and/or the non-focusing region, and a supplemental light source, wherein the supplemental light source is located on a common straight line as the non-emitting region and the non-focusing region, and avoids an optical path of the output light of the laser array light source, and wherein an output light of the supplemental light source is incident on the light collecting system.

6. The light emitting device of claim 5, wherein the light collecting system includes a light homogenizing rod.

7. The light emitting device of claim 1, wherein the light collecting system includes a light homogenizing rod.

8. The light emitting device of claim 7, wherein an output port of the light homogenizing rod is located between the laser array light source and the reflective focusing system.

9. The light emitting device of claim 8, wherein the light collecting system further includes a lens or a transparent glass plate, the lens or the transparent glass plate being mounted on the non-emitting region or the non-focusing region, wherein an output light from the light homogenizing rod passes through the non-emitting region or the non-focusing region and transmits through the lens or the transparent glass plate.

10. The light emitting device of claim 7, wherein the light collecting system further includes a collimating lens, the collimating lens being confocal with the reflective light focusing system, wherein the collimating lens collimates the output light from the reflective light focusing system and outputs it to the light homogenizing rod.

11. A light emitting device, comprising:

a laser array light source, including a non-emitting region and an emitting region formed by multiple laser elements;

a reflective light focusing system, including a focusing region and a non-focusing region, the focusing region focusing and reflecting an output light of the laser array light source; and a light collecting system, for collecting an output light of the reflective light focusing system and outputting it;

wherein the light collecting system, the non-emitting region and the non-focusing region are located on a common straight line which is parallel to an optical axis of the output light of the laser array light source, and wherein the light collecting system penetrates through the non-emitting region and/or the non-focusing region, and a collimating lens array, the collimating lens array including collimating lens units that correspond one to one with the laser elements of the laser array light source, wherein each of the laser elements of the laser array light source is located at a predetermined position on an optical axis of its corresponding collimating lens unit and off from a focal point of the collimating lens unit, so that an output light from the collimating lens unit has a predetermined divergence angle.

12. A projection system, comprising the light emitting device of claim 1.

* * * * *